Aug. 19, 1941.      H. S. LEWIS      2,253,278
GAUGE AND TOOL
Filed May 8, 1940
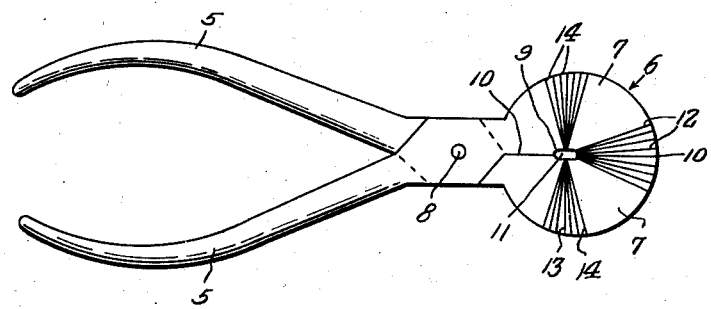
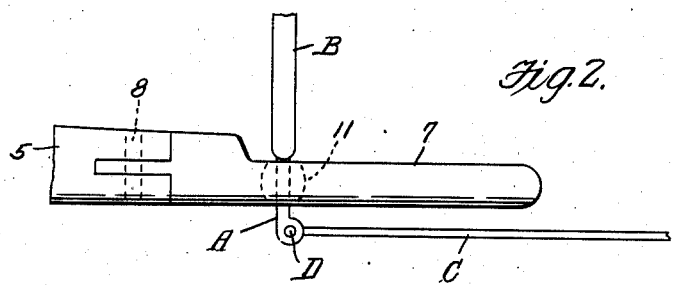
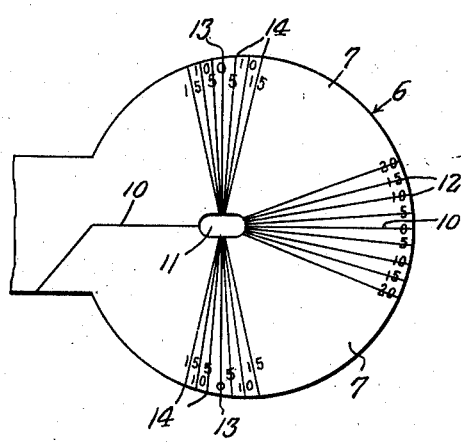
Inventor
Howard Sherman Lewis
By *Clarence A. O'Brien*
Attorneys Patented Aug. 19, 1941

2,253,278

UNITED STATES PATENT OFFICE 2,253,278

GAUGE AND TOOL

Howard Sherman Lewis, Detroit, Mich.

Application May 8, 1940, Serial No. 334,064

1 Claim. (Cl. 33—200)

This invention relates to new and useful improvements in implements for use in conjunction with eye spectacles and more particularly to a gauge tool for gauging and setting the ear pieces or bows of spectacles.

The principal object of the present invention is to provide a tool which has incorporated therein a gauge which will permit the primary gauging of the angular disposition of spectacle bows or ear pieces with respect to their corresponding frames, and which will permit proper angular setting of the ear pieces or bows without removal of the gauge tool from attached position with respect to the spectacles.

Other objects and advantages of the invention will become apparent to the reader of the following specification.

In the drawing:

Figure 1 represents a side elevational view of the tool.

Figure 2 is an enlarged fragmentary top plan view showing the head of the tool applied to one end piece of a spectacles frame.

Figure 3 is a fragmentary enlarged side elevational view of the gauge head of the tool.

Referring to the drawing wherein like numerals designate like parts, it can be seen that the tool is made up of a pair of handles 5—5 and the resetting head of disk shape and generally referred to by numeral 6. This head 6 is divided into half sections 7—7 which are formed on corresponding ends of the handles 5—5, the handles being pivotally connected together as at 8.

Each of the sections 7—7 has a shallow notch 9 in the straight edge portion 10 thereof, to the end that when the sections 7—7 are brought together, an oblong-shaped opening 11 is afforded within which can be clamped one end piece A of a spectacles frame B to which the usual ear piece or bow C is pivotally attached as at D. (See Figure 2.)

At the outermost portion of the head 6, it will be observed that the straight edge portion of the sections 7—7 are marked as a zero line while scale lines 12 radiate from the oblong opening 11 and extend to the outermost edge of the head 6 at each side of the zero mark at the straight edges of the sections 7—7.

Extending transversely across the head 6 are the aligned zero lines 13 while extending from both sides of each zero lines 13 are a plurality of scale lines 14, these scale lines being aligned with corresponding scale lines on the complementary sections 7—7, these scale lines 14 intersecting each other and the zero line 13 at the opening 11.

It can now be seen, that the head 6 can be placed over an end piece A of a spectacles frame B and primarily it can be ascertained what the angular disposition of the bow or ear piece C is with respect to the frame B. If there is insufficient angularly or too much angularity, all that is required is to rotate the tool head with respect to the frame B so as to bend the frame end piece A and as this is done and the frame B reaches the proper angular scale line 14 and the ear piece or bow C reaches the proper scale line 12, the bending operation is ceased and the tool can be removed and the other frame end piece operated on.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A tool for gauging and angularly adjusting one part of a device relative to another comprising a pair of handles pivotally connected at a pair of adjacent ends thereof, jaws on the pivoted ends of the handles, said jaws being in the form of plates and arranged so that a pair of opposed edges thereof can be brought snugly together when the handles are contracted, said opposed edges having opposed work-receiving recesses therein, said jaw plates having gauge lines on one side thereof extending from the said recesses to the outermost edges of the plates.

HOWARD SHERMAN LEWIS.